United States Patent Office 3,608,312
Patented Sept. 28, 1971

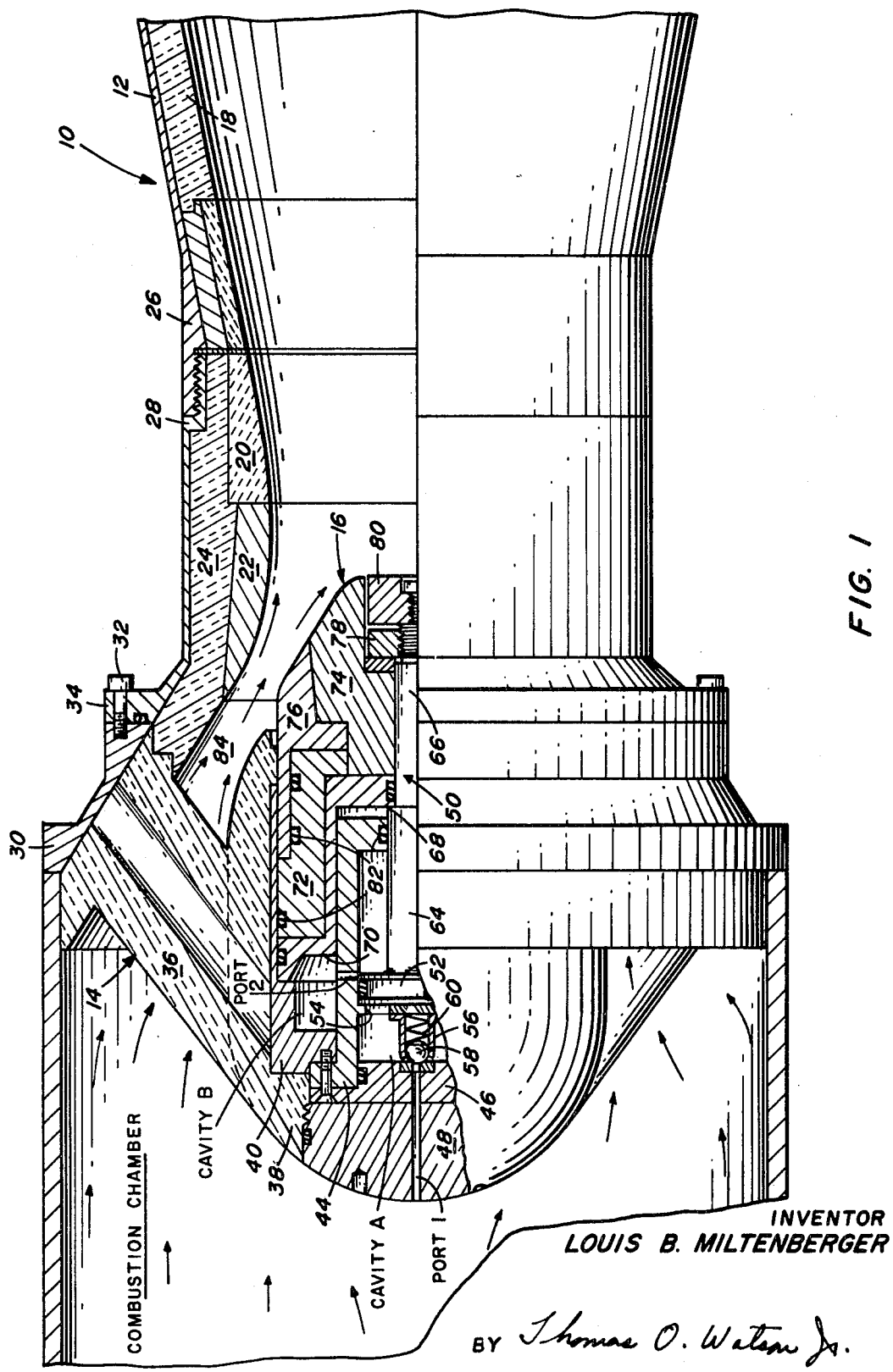

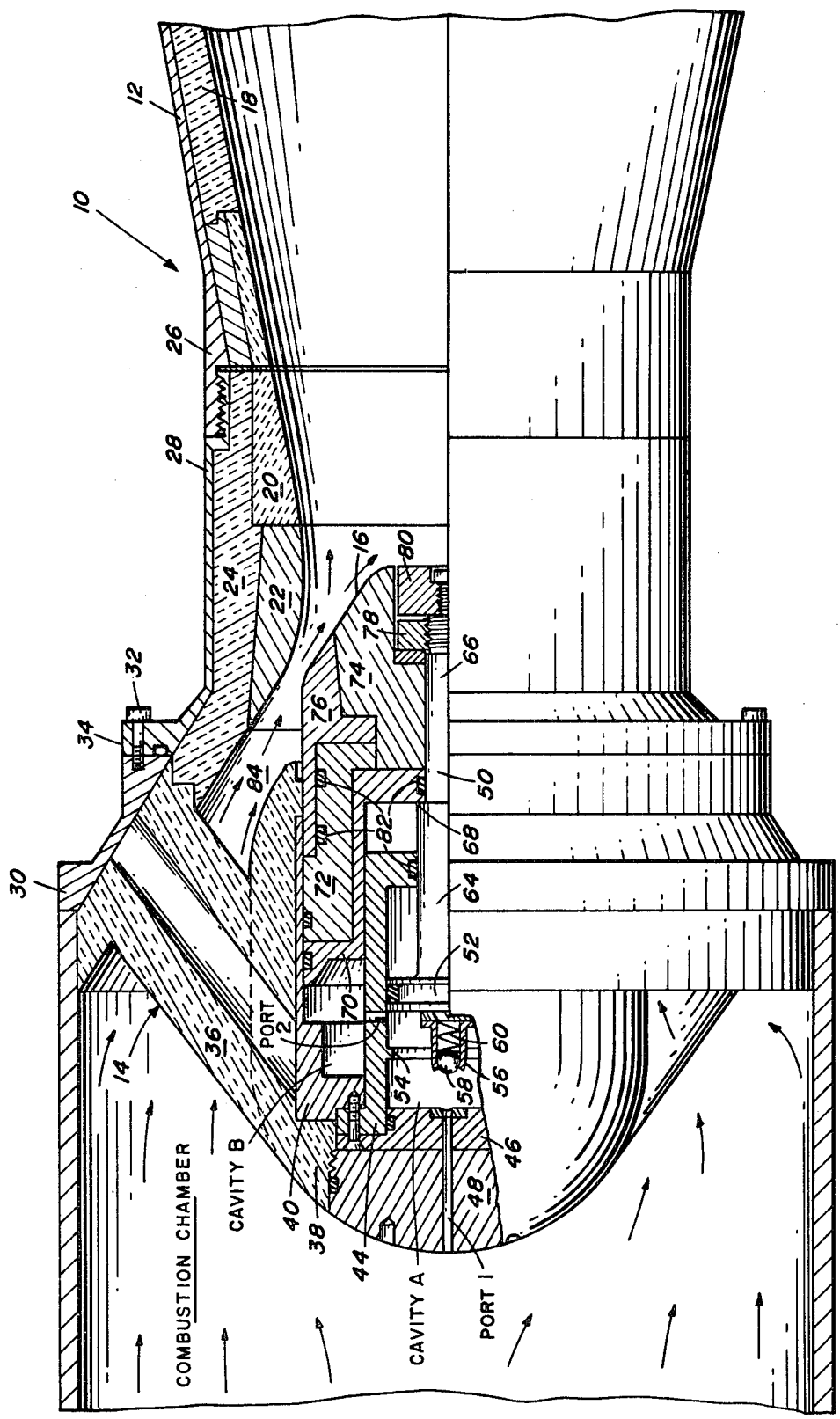

3,608,312
SELF-ACTUATED DUAL AREA ANNULAR NOZZLE
Louis E. Miltenberger, Ridgeley, W. Va., assignor to the United States of America as represented by the Secretary of the Navy
Filed Oct. 22, 1969, Ser. No. 868,657
Int. Cl. B63h 11/00
U.S. Cl. 60—204     2 Claims

ABSTRACT OF THE DISCLOSURE

An annular nozzle having a movable pintle and check valve assembly which is self-actuated to change the throat area from a maximum to a minimum and provide dual thrust levels. During boost operation, chamber gases pressurize a first cavity in the front of the pintle and as the boost propellant burns, exhaust gas flows through the annular throat passage of the nozzle and the resulting expanding gas pressure on the rear or supersonic section of the pintle exceeds the pressure in the first cavity and holds the pintle in a retracted position to provide a maximum throat area for the boost operation. Subsequent to boost termination, the pressure on the rear section of the pintle decreases and is exceeded by the high pressure of the gases confined in the first cavity by means of the check valve. This pressure differential forces the pintle to an extended position and is thereby self-actuated to provide a minimum throat area throughout the sustain phase of rocket motor operation.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to improvements in dual thrust rocket motor nozzles and more particularly it pertains to a new and improved nozzle wherein a movable pintle and check valve assembly is self-actuated to automatically vary the throat area and change from the boost to the sustain phase of rocket motor operation.

In the field of dual thrust rocket motors it has been the general practice to employ dual chambers and/or dual nozzles to provide boost and sustain phases of rocket motor operation. However, the provision of dual thrust chambers in the prior art creates disadvantages in that extra space in the rocket motor is required where space is at a premium. Further, the weight of the dual thrust chambers is excessive and cost is increased.

Also, the prior art use of dual nozzles to provide the dual thrust levels for boost and sustain operation creates difficulties in that a complicated and costly system is necessary to eject the boost nozzle and move the sustainer nozzle into operating position.

In the present invention these problems are overcome by utilizing a single chamber, single nozzle, dual throat area to obtain dual thrust levels in a rocket motor.

Another aspect of the invention eliminates the need for a control signal to initiate the transition from boost to sustain operation. Also many prior art devices require an external power source for actuation. However, in the present invention automatic control of the effective cross sectional area of the nozzle passage is obtained by self-actuated apparatus which is responsive to pressure conditions in the combustion chamber.

SUMMARY OF THE INVENTION

The general purpose of the invention is to provide dual thrust levels without the use of dual chambers and/or dual nozzles. A simple and inexpensive device is used to vary the throat area whereby the actuation is automatic and responsive to pressure conditions in the combustion chamber. Advantages of the system over other dual area nozzles are that it requires less actuating parts, it requires no external power source for actuation, and it requires no control signal to initiate boost-sustain transition.

OBJECTS OF THE INVENTION

An object of the present invention is the provision of a dual thrust rocket motor nozzle having improved operational ranges and which avoids the disadvantages heretofore present.

Another object is to provide a nozzle having efficient propellant utilization at both the boost and sustain phases of rocket motor operation and eliminates the necessity for dual thrust chambers and/or dual nozzles.

A further object of the invention is to significantly increase performance in a dual thrust propulsion system by maintaining maximum motor design pressure for both thrust levels.

Still another object is to provide an annular nozzle having a dual throat area wherein the maximum throat area is used for boost operation and the minimum throat area is used for sustain operation.

A still further object is to provide an annular nozzle which is self-actuated to automatically change the thrust level from the boost to the sustain phase of operation.

Yet another object is to provide an annular nozzle wherein a movable pintle and check valve assembly is self-actuated to automatically vary the throat area from a maximum to a minimum to change from the boost to the sustain phase of rocket motor operation.

Other objects, advantages and novel features of the invention will become apparent from the following detailed description of the invention when considered in conjunction with the accompanying drawings.

BRIEF DESCRIPTION OF THE DRAWINGS

FIG. 1 is a side view, partially in section, of a dual thrust rocket motor nozzle with the parts shown in the position they assume during the boost phase; and FIG. 2 is a view of the embodiment of FIG. 1 in the sustainer phase of rocket motor operation.

DESCRIPTION OF THE PREFERRED EMBODIMENTS

FIG. 1 shows a preferred embodiment of a rocket motor nozzle 10. The primary components of the nozzle 10 include a convergent-divergent outside expansion cone 12, a fixed position insulated centerbody housing 14 which is attached to the combustion chamber and a movable pintle and check valve assembly 16 which slides within the housing 14 to vary the throat area of the nozzle 10.

The inner surface of the cone 12 is divided into sections 18, 20, 22 and 24, each section being made of a different material. Preferably, section 18 may be made of silica phenolic, section 20 of Speer 9139 graphite, section 22 of copper infiltrated tungsten and section 24 of asbestos phenolic. As can be seen in FIG. 1, section 24 also forms an intermediate surface of the cone 12.

The outer surface of the cone 12 is divided into sections 26, 28 and 30. Preferably, section 26 may be made of 6061–T6 aluminum and is screw fitted at one end to section 28. Bolts 32 join the flanged end 34 of section 28 to section 30, said section preferably being formed of 4130 steel.

Fixedly attached by struts 36 to the forward portion of the cone 12 is the insulated centerbody housing 14. The inner ends of struts 36 form an annular sleeve 38 within which a sleeve 40 is disposed. Bolted to member 40 are sleeve member 44 and a disc-shaped member 46, sleeve 44 at its mid-portion containing Port No. 2 and disc 46 at its center forming the inner portion of Port No. 1. The outer portion of Port No. 1 is located in nose member 48 which is threaded to the forward end of sleeve 38.

Mounted within housing 14 is the movable pintle and check valve assembly 16 which slides from the retracted position shown in FIG. 1 to the extended position shown in FIG. 2. At the center of the pintle assembly 16 is a piston rod 50 having thereon a piston 52 which in the retracted position of FIG. 1 abuts a flange 54 on sleeve 44 and forms therewith Cavity A. Rigidly attached by an extension 56 to the front face of piston 52 is a check valve assembly consisting of a ball 58 which is biased by a spring 60 against Port No. 1. The piston rod 50 is formed of a section 64 having a greater diameter and a section 66 having a lesser diameter, the junction of these two sections forming a shoulder 68 which engages one end of a sliding member 70. Rigidly attached to the rear portion of sliding member 70 and sliding therewith are two pintle members 72 and 74 forming a groove for a fitted member 76. Members 70, 72 and 76 form a sliding surface within sleeve 40 which constitutes a guide for this portion of the pintle assembly 16. Between these members and sleeve 44 there is defined an annular Cavity B. At the rear portion of the pintle assembly 16, the piston rod section 66 is threaded within a connector ring 78 which engages a closure member 80 located within the cavity formed in pintle member 74. O-ring seals 82 are located between the members to prevent leakage.

OPERATION OF THE INVENTION

The movable pintle and check valve assembly 16 is initially assembled with the pintle in the fully retracted position shown in FIG. 1 allowing a maximum throat area for the boost operation. (The pintle assembly is held in this retracted position by a weak latch or adhesive bond, not shown, to maintain the nozzle throat area open during transportation or handling operations.) Concurrent with motor ignition and pressurization, combustion chamber gases will bleed through Port No. 1, force the check valve open, and pressurize Cavity A to the maximum motor operating pressure for the boost operation. Simultaneously, exhaust gas flows through the annular throat passage 84 and the resultant expanding gas pressure acting on the rear or supersonic section of the pintle assembly 16 exceeds the pressure in Cavity A and holds the pintle in the retracted position shown in FIG. 1 to provide the maximum throat area for the boost operation. Subsequent to boost termination, combustion chamber pressure decreases which causes the pressure on the rear section of the pintle to decrease and at a predetermined design point the high pressure of the gases sealed in Cavity A exceeds the decreasing rear pintle pressure. This pressure differential forces the pintle from the retracted position shown in FIG. 1 to the extended position shown in FIG. 2 to provide the minimum throat area for the sustain phase of operation. The movement of the pintle assembly uncovers Port No. 2 thereby allowing Cavity B to become pressurized with chamber gases through Port No. 1 and Cavity A and exert a force on member 70 of the pintle assembly 16. The chamber pressure, in effect, then operates over the total cross-sectional area of the movable pintle and greatly exceeds the rear pressure on the pintle. Throughout the sustain phase of operation the nozzle remains in the extended position shown in FIG. 2 due to the aforementioned pressure differential and thereby permits full motor design operating pressure to be used during both the boost and sustain phases of motor operation. As can be seen from this description the movement of the pintle assembly 16 is self-actuated and the pintle automatically moves to the extended position in a smooth manner as the boost propellant burns out and gradually decreases the pressure on the rear section of the pintle assembly.

Obviously many modifications and variations of the present invention are possible in the light of the above teachings.

What is claimed is:

1. A method of varying the thrust of a rocket motor comprising the steps of:
   generating combustion gas in a combustion chamber by burning propellant;
   bleeding a portion of said combustion gas into a first cavity, to act on the forward section of a pintle assembly;
   allowing exhaust gas pressure to act on the rear section of said pintle assembly and to exceed the combustion pressure whereby the pintle assembly is held in a retracted position to provide a maximum throat area;
   subsequent to boost propellant burnout bleeding said combustion gas into a second cavity and pressurizing it; and
   the pressure of said first and second cavities acting on the forward section of said pintle assembly exceeding the decreasing exhaust gas pressure acting on the rear section thereof whereby said pintle assembly is moved to an extended position to provide a minimum throat area.

2. A condition responsive dual area annular rocket motor nozzle comprising:
   a convergent-divergent outside expansion cone;
   a housing attached to one end of said cone and coaxial therewith;
   a pintle assembly disposed within said housing and movable axially of the cone for varying the throat area, said pintle assembly normally being held in a fully retracted position by exhaust pressure acting on the rear section thereof to provide maximum throat area;
   thrust varying means forming a part of said pintle assembly and including a first and second annular cavity defined by said housing and the forward section of said pintle assembly, said thrust varying means being responsive to a reduction in exhaust gas pressure for moving said pintle assembly to an extended position to provide minimum throat area;
   said first cavity being in fluid communication with a combustion chamber by means of a check valve to control the flow of combustion chamber gases through a first port to pressurize said first cavity;
   said check valve sealing the high pressure of said combustion chamber gases in said first cavity to act on the forward section of said pintle assembly;
   said chamber pressure in said first cavity being exceeded by the exhaust gas pressure acting on the rear section of the pintle assembly to hold it in a retracted position to provide the maximum throat area;
   a piston located in the forward section of said pintle assembly that is operable to uncover a second port between said first and second annular cavities as the exhaust gas pressure acting on the rear section of the pintle assembly decreases with boost termination;

said check valve allowing chamber gas to pressurize said second cavity through said first and second ports to act on the forward section of said pintle assembly; and said chamber pressure in said first and second cavities exceeding the exhaust gas pressure acting on the rear section of said pintle assembly to move it to an extended position to provide minimum throat area.

References Cited

UNITED STATES PATENTS 3,495,408   2/1970   Frey _____ 60—242

SAMUEL FEINBERG, Primary Examiner

U.S. Cl. X.R.

60—242, 245, 271